US006964162B2

(12) United States Patent
Takahashi et al.

(10) Patent No.: US 6,964,162 B2
(45) Date of Patent: Nov. 15, 2005

(54) HYDRAULIC PRESSURE GENERATING APPARATUS

(75) Inventors: Makoto Takahashi, Yokohama (JP); Osamu Shindo, Yokohama (JP); Atsushi Narabe, Musashino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 56 days.

(21) Appl. No.: 10/721,545

(22) Filed: Nov. 26, 2003

(65) Prior Publication Data

US 2004/0103657 A1 Jun. 3, 2004

(30) Foreign Application Priority Data

Dec. 2, 2002 (JP) ............................ 2002-350409

(51) Int. Cl.7 .......................... F16D 31/02; F04B 39/10
(52) U.S. Cl. ............... 60/453; 137/565.19; 137/565.33
(58) Field of Search .................. 60/453, 454; 137/314, 137/565.19, 565.33, 341

(56) References Cited

U.S. PATENT DOCUMENTS 5,600,954 A * 2/1997 Bay et al. ..................... 60/454

FOREIGN PATENT DOCUMENTS

| | | |
|---|---|---|
| FR | 1 603 503 | 5/1971 |
| JP | 11-351209 | 12/1999 |
| JP | 2000-38905 | 2/2000 |

* cited by examiner

*Primary Examiner*—Edward K. Look
*Assistant Examiner*—Michael Leslie
(74) *Attorney, Agent, or Firm*—Oblon, Spivak, McClelland, Maier & Neustadt, P.C.

(57) ABSTRACT

A hydraulic pressure generating apparatus includes a hydraulic oil feed line for feeding hydraulic oil with high pressure from an oil tank to a hydraulic pressure control system of a generator by an oil feeding pump unit, a hydraulic oil return line for returning drain oil from the hydraulic pressure control system to the oil tank, and a circulation line for circulating and purifying the hydraulic oil of the oil tank by a circulating pump unit. In such apparatus, the hydraulic oil is flame resistant hydraulic oil which is hardly deteriorated by direct heating, and the flame resistant hydraulic oil is heated by a heater disposed in the oil tank.

13 Claims, 3 Drawing Sheets

HYDRAULIC PRESSURE GENERATING APPARATUS

BACKGROUND OF THE INVENTION

1. Field of the Invention

The present invention relates to a hydraulic pressure generating apparatus for feeding high pressure flame resistant (resisting) hydraulic oil to a hydraulic pressure control system of a generator (or motor) of such as a steam turbine and gas turbine, specifically, to a hydraulic pressure generating apparatus intended for making the apparatus construction compact, reducing costs, improving facility of maintenance and safety in operation.

2. Relevant Art

Conventionally, in a hydraulic pressure control system applied to a generator of such as a steam turbine and gas turbine, flame resistant hydraulic oil, specifically, phosphoric acid ester oil is applied with high pressure and high cleanliness for quickly activating control valves, feeding clean control oil to servo valves, and preventing fire from generating due to leakage of the control oil.

However, since phosphoric acid ester oil has viscosity which varies largely according to temperature, when starting operation of a plant installed in a cold district, it is necessary to raise the temperature to the used temperature at which the viscosity of the hydraulic oil is sufficiently lowered by heating. However, the phosphoric acid ester oil also has a property of being largely deteriorated by direct heating by, for example, an electrical heater. On this account, in the conventional plant using phosphoric acid ester oil, such direct heating could not be performed, and, for example, there was adopted a construction in which a heating chamber surrounding the entire oil tank is formed and indirect heating is externally performed, which results in that the construction surrounding the oil tank becomes complex and large scaled.

In addition, under the complex oil tank construction surrounded by such heating chamber, for convenience of maintenance, since it is difficult to install the oil feeding pump within the tank, there is conventionally adopted an external pump drive type construction, in which a pipe is guided from the oil tank to the outside, and the oil feeding pump is provided to the external pipe. Therefore, the pipe construction becomes complex due to the pipe for external pump installation and an exclusive pump installation space is needed, and accordingly, the scale of the apparatus becomes further larger.

Furthermore, since phosphoric acid ester oil tends to be hydrolyzed to produce an aggravating material and stick the movable portion of a hydraulic pressure device, it is necessary to strictly control an acceptable value of water content, and since the phosphoric acid ester is easily deteriorated, there is required some means or like to prevent deterioration by an activated clay filter.

Furthermore, phosphoric acid ester oil has toxicity, and it is not only difficult to handle it, but also very difficult to dispose the same because the oil can not be easily wasted, and it is also difficult to handle the exchanging devices, maintenance tools, etc. applicable to phosphoric acid ester oil and to dispose waste thereof.

Recently, in place of such phosphoric acid ester oil, there have been provided a proposal for applying mineral oil ((1) Japanese Patent Application Laid-Open No. 2000-38905) or a proposal for applying fatty acid ester oil ((2) Japanese Patent Application Laid-Open No. HEI 11-351209).

However, in these proposals, there is still no specific presentation regarding how the large-scaled construction for externally heating the oil tank is solved, and effective measures for avoiding complexity of the construction due to the oil feeding pump installed outside of the tank. In the proposal of the above Patent Document 1, it is intended that an activated clay filter is omitted and toxicity is avoided by applying mineral oil in place of phosphoric acid ester oil. However, since the mineral oil is applied in this proposal, the possibility of fire can not be overcome in the case where the high pressure oil flies in all directions in case of leakage. Further, in the proposal of the above Patent Document 2, it is intended, by applying the fatty acid ester oil, which is high pressure flame resistant oil, that the safety is ensured and the construction is simplified. There is, however, no specific presentation to be applied to an actual device, such as heating means at the time for activation in a cold district and any measurement for continuous operation at the time of exhaustion of the hydraulic pressure generating system components, or consideration of facility of component exchange in an inspection.

Therefore, in the conventional technology, from a realistic point of view, there has not yet sufficiently been solved problems of larger scale, complexity, high costs, and maintenance difficulty of the construction of the hydraulic pressure generating apparatus or like.

As described above, in the conventional technology, there is provided no specific presentation regarding means to solve the large-scaled construction for externally heating the oil tank, an effective measure for avoiding complexity of the construction due to the oil feeding pump installed outside of the tank, a measure against a fire in a case of leakage of the hydraulic oil, an installation of heating means at the time of activation in a cold district, a measurement for continuous operation at the time of exhaustion of the hydraulic pressure generating system components, or consideration of facility of component exchange at a time of an inspection or like from a realistic points of view such as larger scale, complexity, high costs, maintenance difficulty of the construction of the apparatus have not yet been sufficiently solved.

SUMMARY OF THE INVENTION

The present invention is achieved in light of the fact described above and an object thereof is to substantially eliminate defects or drawbacks encountered in the prior art mentioned above and to provide a hydraulic pressure generating apparatus capable of being sufficiently intended for miniaturization of the construction of the apparatus, cost reduction, facility of maintenance, and improvement in safety in consideration of various installation conditions, operation conditions, inspection conditions, etc. in relation to the steam turbine, gas turbine, and the like.

In the case where phosphoric acid ester oil, which is easily deteriorated by direct heating, is applied for hydraulic pressure control of a generator or motor of such as steam turbine, there were provided problems, as mentioned above, of large scale and complexity of the machine construction because the oil tank is heated from surroundings as indirect heating type and a tank surrounding wall and a device for feeding warm air are provided. The inventors studied and analyzed various characters regarding flame resistant hydraulic oil, and as a result, they confirmed the existence of an oil that is only slightly deteriorated by direct heating among recently developed flame resistant hydraulic oils. That is, they found that, by applying such flame resistant hydraulic oil, the direct heating can be performed, and, by providing a direct heating type heater within the oil tank, the tank surrounding wall and the device for feeding warm air can be omitted for miniaturization and simplification of the machine construction, as well as extreme reduction of costs and labor in operation, maintenance, etc.

Further, in the case where the oil tank having such construction is applied, installation of an oil feeding pump within the oil tank becomes easier, and installation of the oil feeding pump outside of the oil tank becomes unnecessary. By omitting the external pipes or like, simplification of the construction and the improvement in maintenance can be intended. Further, it is to be noted that, in the hydraulic oil, since water within the air mixed into the oil during operation is condensed, the oil mixed with the water is possibly fed to the hydraulic pressure system if the oil feeding pump is simply installed within the oil tank. It is not preferable that, when water is mixed, the flame resistant hydraulic oil is clouded and air bubble is generated, and the hydraulic oil cannot exert performance originally as hydraulic oil. To this regard, the inventors found that, by applying the flame resistant hydraulic oil having a specific gravity less than 1, and holding the separated state by sinking the water at the inside bottom of the oil tank using difference of specific gravity from water, while by preventing the water from mixing into the hydraulic oil by disposing the oil feeding pump on the side upper than the bottom portion within the oil tank, the occurrence of the above described phenomena can be prevented and the hydraulic oil in a good state can be suctioned from the oil feed pump.

Further, regarding the points that, since phosphoric acid ester oil is easily oxidized, the hydraulic pressure generating apparatus using the phosphoric acid ester requires activated clay filter to cause complexity of the system, and since the phosphoric acid ester oil has toxicity, the maintenance is interrupted by the necessity of avoiding contact with a human body, the inventors found that these points can be accommodated by using flame resistant oil having high oxidation resistance and low toxicity as the control oil.

Based on the above recognitions or considerations of the inventor of the subject application, the above-mentioned objects of the present invention can be achieved by providing, in one aspect, a hydraulic pressure generating apparatus comprising:

a hydraulic oil feed line for feeding hydraulic oil with high pressure from an oil tank to a hydraulic pressure control system of a generator by an oil feeding pump unit;

a hydraulic oil return line for returning drain oil from the hydraulic pressure control system to the oil tank; and a circulation line for circulating and purifying the hydraulic oil of the oil tank by a circulating pump unit, and in such apparatus, the hydraulic oil is flame resistant hydraulic oil which is hardly deteriorated by direct heating, and the flame resistant hydraulic oil is heated by heating means disposed in the oil tank.

In another aspect, in such apparatus, the hydraulic oil is flame resistant hydraulic oil having specific gravity of less than 1, and the oil feeding pump is of in-tank installation type and disposed on a side upper than a bottom portion in the oil tank.

In a further aspect, in such apparatus, the control oil is flame resistant hydraulic oil having high oxidation resistance, and the circulation line is of activated clay filter (or earth filter) dispensable type.

In a still further aspect, in such apparatus, the control oil is flame resistant hydraulic oil having low toxicity.

In the above aspects, the flame resistant hydraulic oil may be fatty acid ester oil, and the flame resistant hydraulic oil may have a feeding pressure set to be equal to or more than 6.8 MPa.

Furthermore, in the above aspects, the oil feeding pump unit includes a main oil feeding pump and an auxiliary oil feeding pump in parallel to the hydraulic oil feed line, and the circulating pump unit includes a first circulating pump and a second circulating pump in parallel to the circulation line, the main oil feeding pump and the first circulating pump being of direct-coupled type, which are simultaneously driven by one motor, and the auxiliary oil feeding pump and the second circulating pump being of direct-coupled type, which are simultaneously driven by another motor.

The hydraulic oil feed line may be provided with at least one or more feed oil filters, check valves, and stop valves, and the circulation line may be provided with at least one or more oil coolers, circulating oil filters, check valves, and stop valves.

The hydraulic oil feed line and the hydraulic oil return line are connected by a bypass line, and at least one or more stop valves are arranged to the bypass line.

The hydraulic pressure generating apparatus may further comprises a temperature sensor for sensing temperature in the oil tank, and temperature control means for controlling heating means disposed in the oil tank in accordance with the temperature in the tank sensed by the temperature sensor.

In a modified aspect of the present invention, the above-mentioned object may further achieved by providing a hydraulic pressure generating apparatus comprising:

a hydraulic oil feed line for feeding hydraulic oil with high pressure from an oil tank to a hydraulic pressure control system of a generator by an oil feeding pump unit;

a hydraulic oil return line for returning drain oil from the hydraulic pressure control system to the oil tank; and a circulation line for circulating and purifying the hydraulic oil of the oil tank by a circulating pump unit, wherein the flame resistant hydraulic oil is fatty acid ester oil which is fed at a feeding pressure set to be equal to or more than 6.8 MPa.

In a further modified aspect of the present invention, the above-mentioned object may further achieved by providing a hydraulic pressure generating apparatus comprising:

a hydraulic oil feed line for feeding hydraulic oil with high pressure from an oil tank to a hydraulic pressure control system of a generator by an oil feeding pump unit including a main oil feeding pump and an auxiliary oil feeding pump in parallel to the hydraulic oil feed line, the hydraulic oil feed line being provided with at least one or more feed oil filters, check valves, and stop valves;

a hydraulic oil return line for returning drain oil from the hydraulic pressure control system to the oil tank; and a circulation line for circulating and purifying the hydraulic oil of the oil tank by a circulating pump unit including a first circulating pump and a second circulating pump in parallel to the circulation line, the circulation line being provided with at least one or more oil coolers, circulating oil filters, check valves, and stop valves, the main oil feeding pump and the first circulating pump being of direct-coupled type, which are simultaneously driven by one motor, and the auxiliary oil feeding pump and the second circulating pump being of direct-coupled type, which are simultaneously driven by another motor, and the hydraulic oil feed line and the hydraulic oil return line being connected by a bypass line, and at least one or more stop valves are arranged to the bypass line.

In the above respective aspects, as the fatty acid ester oil, it is desired that the base oil is organic fatty acid ester and the main component thereof consists of fatty acid and polyol ester. The desired specific gravity of the fatty acid ester oil is equal to or more than 0.8 g/cm$^3$ and less than 1.0 g/cm$^3$, assuming the specific gravity is a ratio of the density of the hydraulic oil at temperature of 15° C. relative to the density of water at temperature of 4° C., and specifically desirable to be equal to or less than approximately 0.92 g/cm$^3$.

The desired viscosity of the fatty acid ester is 20 to 70 cSt (20 to 70×10$^{-6}$) m$^2$/sec) at 40° C., which is general oil temperature when feeding to the hydraulic pressure system. The viscosity index is desirable to be equal to or more than 100, specifically desirable from 150 to 250, and most desirable to be in the order of 180.

Furthermore, it is desired in safety and practical use that the flash point is 240 to 340° C., fire point is 280 to 380° C., and spontaneous ignition temperature is more than 430° C. The acute toxicity is desirable LD50>1.02 ml/N.

According to the present invention of the characters and structures mentioned above, there is provided the hydraulic pressure generating apparatus capable of achieving the miniaturization of the construction of the apparatus, cost reduction, facility of maintenance, and improvement in safety in consideration of various installation conditions, operation conditions, inspection conditions, and the like in relation to the steam turbine, gas turbine, and the like generator.

The nature and further characteristic features of the present invention will become more clear from the following descriptions made with reference to the accompanying drawings.

DESCRIPTION OF THE PREFERRED EMBODIMENTS

Hereinafter, embodiments of a hydraulic pressure generating apparatus according to the invention will be described with reference to the accompanying drawings.

Figure 1:
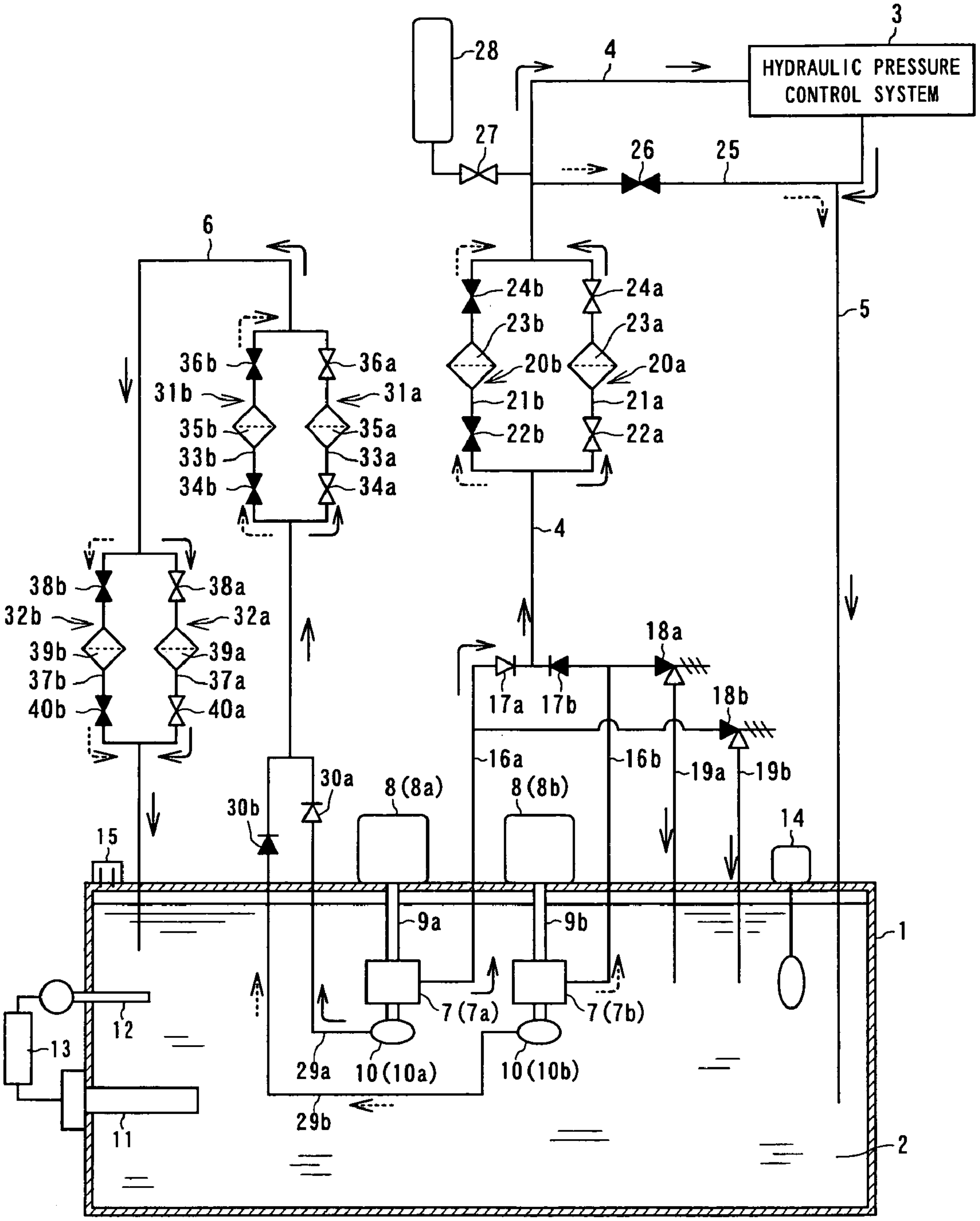
FIG. 1 is a schematic diagram showing an hydraulic pressure control apparatus of one embodiment of the invention.

FIG. 1 is a schematic diagram showing the hydraulic pressure generating apparatus according to one embodiment of the invention, which is applied to an hydraulic pressure control system of such as a steam turbine or gas turbine.

As shown in FIG. 1, the hydraulic pressure generating apparatus includes an oil tank 1, a hydraulic oil feed line 4 for feeding hydraulic oil 2 accommodated in the oil tank 1 to an hydraulic pressure control system 3 such as a steam turbine or gas turbine with high pressure, a hydraulic oil return line 5 for returning drain oil from the hydraulic pressure control system 3 to the oil tank 1, and a circulation line 6 for performing purification or cooling by circulating the hydraulic oil 2 of the oil tank 1.

The oil tank is constituted by a sealed box type container, for example, and has a simple construction which requires no exterior coverage in its periphery. On the upper portion within the oil tank 1, there is disposed a feeding pump 7 for discharging the accommodated hydraulic oil 2 into the hydraulic oil feed line 4 with pressure. The feeding pump includes a main oil feeding pump 7*a* for normal use and an auxiliary oil feeding pump 7*b* for emergency. These main oil feeding pump 7*a* and auxiliary oil feeding pump 7*b* are disposed in parallel to the hydraulic oil feed line 4 and in a position upper than a bottom portion within the oil tank 1, and these pumps are also directly coupled to vertical drive shafts 9*a* and 9*b* of the motor 8 (8*a*, 8*b*) provided on an upper wall of the oil tank, respectively. Accordingly, these main oil feeding pump 7*a* and auxiliary oil feeding pump 7*b* are adapted to be operable simultaneously or separately by a control unit, which is not shown. Further, the main oil feeding pump 7*a* and auxiliary oil feeding pump 7*b* have self-pressure compensators, which are not shown, for stably feeding a required control oil with constant pressure by holding the discharging pressure constant.

In addition, a first circulating pump 10*a* and a second auxiliary circulating pump 10*b* are provided in the oil tank as a circulating pump 10 for circulating the accommodated hydraulic oil 2 in the circulation line 6. These first circulating pump 10*a* and the second auxiliary circulating pump 10*b* are disposed in parallel to the circulation line 6 and adjacently on the lower side of the main oil feeding pump 7*a* and auxiliary oil feeding pump 7*b*.

The first circulating pump 10*a* is coaxially connected to the drive shaft 9*a* for rotating the main oil feeding pump 7*a* and the second auxiliary circulating pump 10*b* is coaxially connected to the drive shaft 9*b* for rotating the auxiliary oil feeding pump 7*b*. That is, the main oil feeding pump 7*a* and the first circulating pump 10*a* are of direct-coupled type, which are simultaneously driven by one motor 8*a*, and on the other hand, the auxiliary oil feeding pump 7*b* and the second auxiliary circulating pump 10*b* are also of direct-coupled type, which are simultaneously driven by another motor 8*b*.

Further, a heater 11 is provided within the oil tank as direct heating means capable of contacting the hydraulic oil 2 to directly heat the hydraulic oil 2. This heater 11 has a structure capable of arbitrarily adjusting the heating temperature by an electric heater, for example, and provided in a range from a location of the side wall of the oil tank 1 to the accommodating height of the hydraulic oil 2 with its heater part inserted into the tank. Furthermore, a temperature sensor 12 for sensing temperature of the hydraulic oil 2 is provided within the oil tank 1. The heater 11 and the temperature sensor 12 are connected to temperature control means 13, and the temperature of the hydraulic oil 2 within the oil tank 1, which has been sensed by the temperature sensor 12, is regularly input to the temperature control means 13. The temperature inside of the tank is compared with the preset temperature by the temperature control means 13 in accordance with the input (signal) from the temperature sensor 12, and the heating temperature of the heater 11 is automatically controlled so as to accord with a target temperature of the hydraulic oil 2.

Further, in the oil tank 1, a liquid level indicator 14 for monitoring the level of oil within the tank of the hydraulic oil 2, an air breather 15 for keeping the oil tank 1 with atmosphere pressure and maintaining air that contacts the hydraulic oil 2 in a dry state are provided.

The hydraulic oil feed line 4 is constituted as a pipe line to a hydraulic control system 3 by integrating discharging pipe units 16*a* and 16*b* of pump, which are separately guided from the main oil feeding pump 7*a* and the auxiliary oil feeding pump 7*b* to the outside of the oil tank 1. In the respective discharging pipe units 16*a* and 16*b* of pump, there are also disposed check valves 17*a* and 17*b* for back flow prevention of the line are provided, respectively, and relief pipe units 19*a* and 19*b* to the oil tank 1, which have relief valves 18*a* and 18*b* branching on an upper stream side of those check valves 17*a* and 17*b*.

Oil purifying units 20*a* and 20*b* for purifying the hydraulic oil to be fed are provided on an downstream side of the integrated part of the discharging pipe units 16*a* and 16*b* of the hydraulic oil feed line 4. For example, two sets of oil purifying units 20*a* and 20*b* are provided in branch pipe units 21*a* and 21*b*, by which the hydraulic oil feed line 4 is branched in two, in parallel to each other for normal use and auxiliary use. Both of the feed oil purifying units 20*a* and 20*b* for normal use and auxiliary use have constructions including first stop valves 22*a* and 22*b*, feed oil filters 23*a* and 23*b* for oil filtration, and second stop valves 24*a* and 24*b*, respectively.

The first stop valve 22*a* and the second stop valve 24*a* of the normal feed oil purifying unit 20*a* are of normally open type, and, at the time of normal operation, the hydraulic oil 2 is purified by the feed oil filter 23*a* of the normal feed oil purifying unit 20*a*. The first stop valve 22*b* and the second stop valve 24*b* of the auxiliary feed oil purifying unit 20*b* are of normally closed type, which are opened as occasion demands. For example, in a case where the feed oil filter 23*a* of the normal feed oil purifying unit 20*a* is clogged during the operation, when the filter element is exchanged, the first stop valve 22*a* and the second stop valve 24*a* of the normal feed oil purifying unit 20*a* are closed and the first stop valve 22*b* and the second stop valve 24*b* of the auxiliary feed oil purifying unit 20*b* are opened, and the oil is filtered by the feed oil filter 23*b* of the auxiliary feed oil purifying unit 20*b*.

In the downstream side pipe unit at a junction of these feed oil purifying units 20*a* and 20*b*, there is arranged a bypass line 25 for bypassing the hydraulic oil 2 to the hydraulic oil return line 5 and returning it to the oil tank. In this bypass line 25, one or more normally closed bypass valves 26 may be disposed to be opened as occasion demands.

In addition, in the hydraulic oil feed line 4, an accumulator 28 is provided via a normally open stop valve 27 so that the pressure variation of the fed hydraulic oil 2 may be absorbed.

In the hydraulic pressure control system 3 to which the hydraulic oil 2 is fed via such hydraulic oil feed line 4, a drain pan, a drain collecting unit, etc., which are not shown, are provided, and the hydraulic oil return line 5 is provided from such drain collecting unit to the oil tank 1. The front end portion of the hydraulic oil return line 5 is inserted into the oil tank at a position lower than an inlet opening of the oil feeding pump 7.

The circulation line 6 for circulating the control oil within the oil tank 1 is constituted as a pipe which integrates the discharging pump units 29*a* and 29*b* of pump separately guided from the first circulating pump 10*a* and the second circulating pump 10*b* to the outside of the oil tank 1 and reaches to the oil tank 1 again.

Check valves 30*a* and 30*b* for preventing backflow to the respective circulating pumps 10*a* and 10*b* side are provided in the respective discharging pump units 29*a* and 29*b*, respectively. Furthermore, circulating oil cooling units 31*a* and 31*b* for cooling the circulating hydraulic oil 2 and circulating oil purifying units 32*a* and 32*b* for purifying the circulation oil are provided on the downstream side of the integrated part of the circulation line 6.

For example, two sets of the circulating oil cooling units 31*a* and 31*b* are provided in branch pipe units 33*a* and 33*b*, by which the circulation line 6 is branched in two, in parallel to each other for normal use and auxiliary use, and both the circulating oil cooling units 31*a* and 31*b* for normal use and auxiliary use have constructions, sequentially from the upstream side, including first stop valves 34*a* and 34*b*, coolers 35*a* and 35*b* for cooling the circulating oil, and second stop valves 36*a* and 36*b*, respectively.

The first stop valve 34*a* and the second stop valve 36*a* of the normal circulating oil cooling unit 36*a* are of normally opened type, and, at the time of the normal circulating operation, the circulating oil is cooled by the cooler 35*a* of this normal circulating oil cooling unit 31*a*. The first stop valve 34*b* and the second stop valve 36*b* of the auxiliary circulating oil cooling unit 31*b* are of normally closed type, which are opened as occasion demands. For example, in a case where it is required to exchange the circulating oil cooler 35*a* during operation, the first stop valve 34*a* and the second stop valve 36*a* of the normal circulating oil cooling unit 31*a* are closed and the first stop valve 34*b* and the second stop valve 36*b* of the auxiliary circulating oil cooling unit 31*b* are opened, and thereby, the circulating oil is cooled by the auxiliary cooler 35*b*.

Further, for example, two sets of the circulating oil purifying units 32*a* and 32*b* on the downstream side of the circulating oil cooling units 31*a* and 31*b* are provided in parallel branch pipe units 37*a* and 37*b*, by which the circulation line 6 is branched in two, for normal use and auxiliary use, and both the circulating oil purifying units 32*a* and 32*b* for normal use and auxiliary use have constructions, sequentially from the upstream side, including first stop valves 38*a* and 38*b*, circulating oil filters 39*a* and 39*b* for circulating oil filtration, and second stop valves 40*a* and 40*b*, respectively.

The first stop valve 38*a* and the second stop valve 40*a* of the normal circulating oil purifying unit 32*a* are of normally opened type, and, at the time of normal operation, the hydraulic oil 2 is purified by the circulating oil filter 39*a* of the normal circulating oil purifying unit 32*a*. The first stop valve 38*b* and the second stop valve 40*b* of the auxiliary circulating oil purifying unit 32*b* are of normally closed type, which are opened as occasion demands. For example, in a case where the circulating oil filter 39*a* of the normal circulating oil purifying unit 32*a* is clogged during the circulating operation, when the filter element is to be exchanged, the first stop valve 38*a* and the second stop valve 40*a* of the normal circulating oil purifying unit 32*a* are closed and the first stop valve 38*b* and the second stop valve 40*b* of the auxiliary circulating oil purifying unit 32*b* are opened, and the circulating oil is filtered by the circulating oil filter 39*b* of the auxiliary circulating oil purifying unit 32*b*.

In the hydraulic oil generating apparatus of the embodiment of the structure described above, there will be applied, as the flame resistant hydraulic oil 2, a fatty acid ester oil having organic fatty acid ester as base oil and main component consisting of fatty acid and polyol ester.

This fatty acid ester oil is slightly deteriorated by the direct heating, and when heated to a temperature of about 50° C. by the direct heating type heater 11 provided in the oil tank 1, it will be hardly deteriorated.

Further, it is to be noted that this specific gravity of the fatty acid ester is on the order of 0.92 g/cm$^3$, for example, assuming the specific gravity is a ratio of the density of the hydraulic oil at temperature of 15° C. relative to the density of water at temperature of 4° C., and the fatty acid ester always floats on a level upper than the water mixed into the oil tank 1. Furthermore, it has high oxidation resistance and an activated clay filter etc. is not required.

This fatty acid ester has viscosity of 20 to 70 cSt (20 to $70\times10^{-6}$ $m^2$/sec) at 40° C. and viscosity index on the order of 180, and the viscosity variation according to the temperature variation is moderate compared to phosphoric ester oil. Its flash point is 240 to 340° C., fire point is 280 to 380° C., spontaneous ignition temperature is about 480° C., and acute toxicity is LD50>1.02 ml/N. That is, the fatty acid ester is advantageous in flame resistance and low in toxicity.

The embodiment of the present invention described above will achieve the following function and attain the following operation.

(1) Activation (Operation Starting) Time (Temperature Adjustment, Purification of Hydraulic Oil, etc.)

The hydraulic pressure generating apparatus of the described embodiment can set the hydraulic oil 2 within the oil tank 1 to a predetermined temperature (temperature up or down) and can purify it prior to the operation of a steam turbine plant, gas turbine plant, or like, for example, before the activation thereof at the time when the hydraulic pressure control system 3 does not require the hydraulic oil 2.

In this case, under the state that the normally closed bypass valve 26 of the bypass line 25, which is connected to the hydraulic oil feed line 4, is set in an opened state, the main oil feeding pump 7*a* directly coupled to the motor 8*a* and the first circulating pump 10*a* are simultaneously activated and the operation of the heater 11 and the cooler is started. Accordingly, the hydraulic oil 2 within the oil tank 1 is fed to the hydraulic oil feed line 4 by the oil pump 7, and at the same time, is circulated into the circulation line 6 by the circulating pump 10, while being heated by the direct heating type heater.

The hydraulic oil 2 fed to the hydraulic oil feed line 4 is purified through the feed oil filter 23*a* of the normal feed oil purifying unit 20*a*, flown back from the bypass line 25 to the oil tank 1 via the return line to thereby perform the hydraulic oil purifying operation.

Further, the hydraulic oil 2 circulated into the circulation line 6 by the circulating pump 10 is cooled by the cooler 35*a* of the normal circulating oil cooling unit 31*a*, then purified by the circulating oil filter 39*a* of the normal circulating oil purifying unit 32*a*, and circulated into the oil tank 1. Then, the temperature of the hydraulic oil 2 within the oil tank 1 is adjusted to the target temperature by the heater 11 controlled by the temperature control means 13 and cooling by the cooler 35*a* of the circulation line 6.

In this case, in the embodiment, since the hydraulic oil 2 within the oil tank 1 can be simultaneously purified in both lines of the hydraulic oil feed line 4 and the circulation line 6, the purifying operation is efficiently performed. Furthermore, since the heater 11 is a direct heating type one which directly contacts and heats the hydraulic oil 2 within the oil tank 1, the hydraulic oil 2 within the oil tank 1 can be heated (or cooled) to the target temperature more quickly than a conventional one.

The heating operation of the hydraulic oil 2 is performed specifically and effectively in a case of a plant which is placed in a cold district. For example, in the plant placed in a cold district, the hydraulic pressure generating apparatus is sometimes activated when the hydraulic oil is at extremely low temperature of 0° C. (or lower temperature). In this case, the hydraulic oil 2 within the oil tank 1 can be heated to the target temperature, which is the actual operation temperature, more quickly than the conventional one by setting the temperature sensor 12 so as to sense the hydraulic oil temperature and the heater 11 so as to perform the heating operation until the oil temperature within the control oil tank 1, which is an actual operation temperature, to an optional temperature near 45° C., for example. Furthermore, since the fatty acid ester oil having only slight deterioration to the heating is used as the hydraulic oil 2, the problem of the hydraulic oil deterioration due to the direct heating will never arise.

On the other hand, since the dependence on viscosity of the fatty acid ester oil exhibits characteristic that the viscosity hardly varies according to the temperature variation, the hydraulic pressure generating apparatus might be activated from the state of low temperature.

Alternately, in a case where the hydraulic pressure generating apparatus is activated with the hydraulic oil 2 at room temperature, for example, the direct heating type heater 11 is set, when the hydraulic oil temperature within the oil tank 1 becomes low equal to or less than 30° C., for example, so as to perform the heating operation to the optional temperature near 45° C. and then stop the operation.

Then, in the case where the turbine is activated, the bypass valve 26 is closed, and the normal operation, at which that the hydraulic oil 2 is fed from the oil tank 1 to the hydraulic pressure control system 3 via the hydraulic oil feed line 4, is performed.

According to the described embodiment, at the time when the hydraulic pressure control system 3 does not require the hydraulic oil 2, the control oil can be established in a good state in advance, and, at extremely low temperature, according to the characteristics of the used hydraulic oil 2, the following advantageous effects or functions can be achieved. That is, the direct heating by the direct heating type heater 11 can be performed, the hydraulic oil temperature can be easily raised, and the main oil feeding pump 7*a* can be activated from the low temperature of 0° C. according to the characteristics of the used hydraulic oil 2.

(2) Hydraulic Oil Supply

After the hydraulic oil heating, mentioned above, has been heated, or in a case where, in the normal state, the hydraulic oil has been generated simultaneously with the actual operation, the bypass valve 26 is closed, the hydraulic oil 2 is discharged from the oil tank 1 into the hydraulic oil feed line 4 by the main oil feeding pump 7*a* and fed to the hydraulic pressure control system 3 via the normal feed oil filter 23*a*, and the hydraulic oil 2 is circulated through the operation of the first circulating pump 10*a*. According to such operation, the purification and cooling can be performed by feeding the hydraulic oil 2 accommodated in the oil tank 1 to the hydraulic pressure system 3 with high pressure. The drain oil is returned from the hydraulic pressure system to the oil tank 1 via the hydraulic oil return line 5, and the hydraulic oil 2 of the oil tank 1 is circulated through the circulation line 6.

In this case, the direct heating type heater 11 is preliminarily driven in response to the hydraulic oil temperature sensed by the temperature sensor 12 and set so that the hydraulic oil temperature within the oil tank 1 becomes in the order of 45° C. to 50° C., for example. On the other hand, the circulating pump 10 of the circulation line 6 and the cooler for cooling the circulating oil are activated and set so as to perform the cooling until the hydraulic oil temperature becomes 40 to 45° C. and then stop the operation of the oil cooler so as not to become a further low temperature. According to such operation, the hydraulic oil temperature within the oil tank 1 is regularly controlled at nearly 45° C., for example, and according to such hydraulic oil feeding operation, the temperature control of the hydraulic oil 2 can be easily, quickly, and stably performed through the heating of the heater 11.

Furthermore, the location of the circulating pump 10 which is driven coaxially with the main oil feeding pump 7*a* permits the oil to be continuously cooled and filtered in the special circulating line 6, thus the temperature and the cleanliness of oil being stably controlled.

As described above, by using the fatty acid ester oil as the hydraulic oil 2, the hydraulic oil can be stably fed, while maintaining characteristics of the flame resistance substantially equal to conventional.

Further, in a case where it is requested to increase, in amount, the hydraulic oil during the operation, or in a case where the main oil feeding pump 7*a* becomes lower in performance or malfunctioned, the auxiliary oil feeding pump 7*b* is operated simultaneously with the main oil feeding pump 7*a* or switched to be operated. In this case, the respective normally closed stop valves 22*b* and 24*b* of the auxiliary feed oil purifying unit 20*b* in the hydraulic oil feed line 4 are opened, while the respective normally opened stop valves 22*a* and 24*a* of the normal feed oil purifying unit 20*a* being closed according to the necessity of repair etc. In addition, during the operation of the auxiliary oil feeding pump 7*b*, the second circulating pump 10*b* directly coupled thereto is also operated, and the respective valves of the auxiliary circulating oil cooling unit 35*b* and the auxiliary circulating oil purifying unit 32*b* are also opened. The respective valves 34*a*, 36*a*, 38*a*, and 40*a* of the normal circulating oil cooling unit 31*a* and the normal circulating oil purifying unit 32*a* are closed as occasion demands, and the amount of the hydraulic oil is increased or the circulation line 6 is switched.

As described above, the respective pump operations are flexibly performed, and the stable hydraulic feeding and circulation are performed in a constantly suitable state, thus stably controlling the hydraulic pressure.

Furthermore, the main oil feeding pump 7*a* and the auxiliary oil feeding pump 7*b* have self-pressure compensators and can hold the discharging pressure constant and feed the stable and required control oil at constant hydraulic pressure. Further, the pressure variation of the hydraulic oil feed line 4 is absorbed by the accumulator 28.

According to the described embodiment, since the main oil feeding pump 7*a* and the auxiliary oil feeding pump 7*b* are provided in parallel, the operation efficiency of the hydraulic pressure generating apparatus can be largely improved, thus being advantageous.

Further, in the case where water is mixed within the oil tank 1 during the operation of the hydraulic pressure generation apparatus of the described embodiment, since the specific gravity of the fatty acid ester oil is smaller than water, the mixed water will move towards the bottom side in the oil tank 1. On the other hand, since an inlet portion of the oil feeding pump 7 is provided at the upper position apart from the bottom portion of the oil tank 1 and the hydraulic oil 2 is suctioned from the oil level side, the water is never introduced in the hydraulic oil feed line 4. Therefore, the hydraulic oil 2 can be suctioned from the oil feeding pump 7 constantly in a good state and fed into the hydraulic pressure control system 3 without being adversely affected by the generation or production of white turbidity, air bubbles, or like.

(3) Maintenance

There may cause devices constituting the hydraulic pressure generating apparatus in the embodiment to need the inspection, the repair, exchange, or like during the operation or the halt. For example, sometimes, during the operation, there may arise the need for exchanging the filter element due to the clogging in the feed oil filters 23*a* and 23*b*, and, during the operation, there may also arise the need for performing inspection on the stop valves 22*a*, 22*b*, 24*a*, and 24*b* and the check valves 17*a* and 17*b*.

In such case, in the embodiment, the feed oil purifying units 20*a* and 20*b* for normal use and emergency use are provided in the parallel branch pipe units 21*a* and 21*b* formed by dividing the hydraulic line 4, and both the circulating oil purifying units 20*a* and 20*b* are respectively constructed by including the first stop valves 22*a* and 22*b*, the feed oil filters 23*a* and 23*b*, and the second stop valves 24*a* and 24*b* sequentially from the upstream side. Further, two sets of circulating oil cooling units 31*a* and 31*b* are provided in branch pipe units 33*a* and 33*b*, by which the circulation line 6 is branched in two, in parallel to each other for normal use and auxiliary use, and both the circulating oil cooling units 31*a* and 31*b* for normal use and auxiliary use have constructions, sequentially from the upstream side, including first stop valves 34*a* and 34*b*, cooler 35*a* and 35*b* for cooling circulating oil, and second stop valves 36*a* and 36*b*, respectively.

Furthermore, as to the circulating oil purifying units 32*a* and 32*b*, two sets of circulating oil filters 39*a* and 39*b* are provided in parallel branch pipe units 37*a* and 37*b*, by which the circulation line 6 is branched in two, for normal use and auxiliary use, and constructed, sequentially from the upstream side, by including the first stop valves 38*a* and 38*b*, the coolers 39*a* and 39*b* for circulating oil filtration, and second stop valves 40*a* and 40*b*.

Therefore, the filter element can be exchanged and inspected by closing the stop valves disposed on upstream and downstream sides of either one of the branch pipe units 21*a* and 21*b* and opening the stop valves disposed on upstream and downstream sides of the other of the branch pipe units 21*a* and 21*b* without being affected by the hydraulic pressure of the respective lines. Therefore, at both times of activation and normal operation, the maintenance can be performed without stopping the hydraulic oil feeding.

On the other hand, during the halt, although devices or equipments constituting the hydraulic pressure generating apparatus can be inspected and mended, according to the present embodiment, the hydraulic oil 2 in the tank 1 can be circulated via the hydraulic oil feed line 4, the bypass line 25, and the hydraulic oil return line 5 by opening the normally closed bypass valve 26 of the bypass line. Therefore, for example, when the feed oil filter 23*a* of one parallel branch 20*a* is exchanged, the hydraulic oil purifying operation can be performed in parallel by passing the hydraulic oil 2 through the feed oil filter 23*b* of the other parallel branch 20*b*, and by carrying out the purification during the halt of the apparatus, the hydraulic oil 2 can be purified in a good condition at the time of when repair and inspection made by performing the purification of the hydraulic oil 2 during the halt of the apparatus.

Moreover, since the fatty acid ester oil applied is low in toxicity, the handling of the hydraulic oil 2 itself becomes easy and it can be easily wasted by an easy disposal treatment. In addition, the handling of the exchanging device and maintenance tools for the hydraulic oil 2 and the handling of the waste disposal become easy, and the maintenance can be largely improved. Further, the cost of hydraulic oil can be reduced compared to phosphoric ester oil.

In addition, there is an advantage that the hydraulic oil 2 of the described embodiment can be easily used as criterion of judgment when exchanging to new oil by checking the deterioration condition from the viscosity, the total acid number, etc.

Furthermore, by applying the fatty acid ester oil as the hydraulic oil 2, there may be achieved extremely good wear resistance against the hydraulic pressure devices such as the main oil feeding pump 7*a* and the auxiliary oil feeding pump, and sealing and packing materials other than fluorine rubber such as nitrile rubber, which is considered to be difficult to used for the phosphoric esters hydraulic oil 2, may be used. In this aspect, the maintenance can also be improved.

Figure 2:
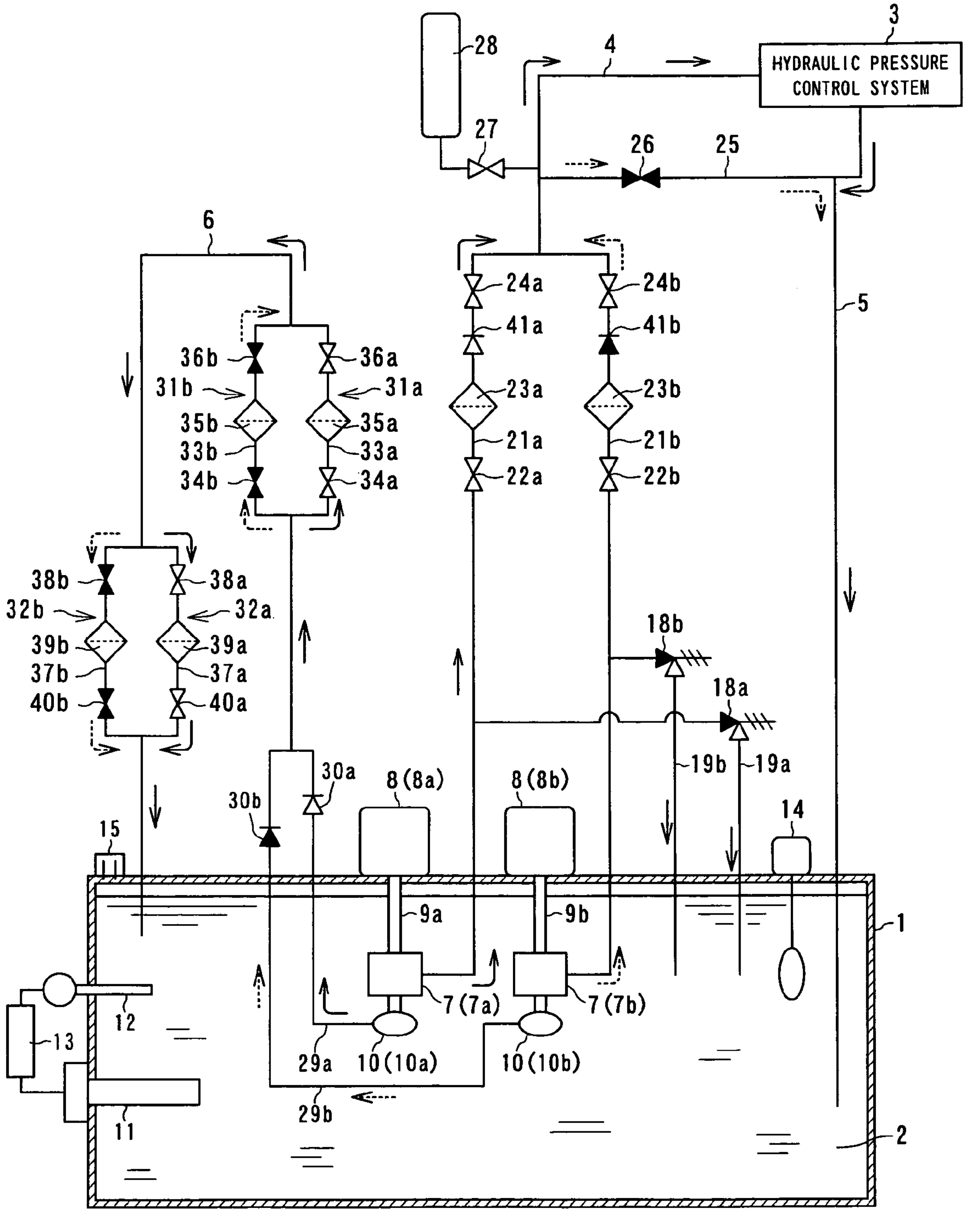
FIGS. 2 and 3 are schematic diagrams showing hydraulic pressure control apparatus of another embodiment of the invention.

FIG. 2 shows a hydraulic pressure generating apparatus according to another embodiment of the present invention.

The hydraulic pressure generating apparatus of this embodiment differs from the embodiment described above with reference to FIG. 1 in that the pipe construction such as the discharging pipe from the oil feeding pump 7 and the feed oil purifying units 20*a* and 20*b* in the hydraulic oil feed line 4 are constituted by independent pipes, respectively, and check valves 41*a* and 41*b* for preventing backflow to the pump side are provided between the feed oil filters 23*a* and 23*b* and the second stop on the downstream side thereof, respectively. The other construction is the substantially the same as that in the first embodiment, and like reference numerals are applied to elements or members corresponding to those shown in FIG. 1 and the description thereof will be omitted herein.

In the hydraulic pressure generating apparatus shown in FIG. 2, for example, in a case where clogging occurs in the feed oil filters 23*a* and 23*b* and it is required to inspect and exchange the filter element during the operation, the backflow of the hydraulic oil 2 to the feed oil filters 23*a* and 23*b* side is prevented by the check valves 41*a* and 41*b*, so that not only the operation to close the downstream side second stop valves 24*a* and 24*b* when inspection and exchange becomes unnecessary, but also the inspection and exchange of the check valves 41*a* and 41*b* can be performed by closing the second stop valves 24*a* and 24*b*. Thus, the operation for inspection, exchange, etc. can be facilitated.

It is further noted that the present invention is not limited to the described embodiments and many other changes and modifications may be made without departing from the scopes of the appended claims.

For example, although only the preferable examples of the characteristic values, etc. of the fatty acid ester oil applied as the hydraulic oil 2 are shown in the respective embodiments, they are not limited to the above described respective values etc., and various changes can be made to the values without departing from the scope of the invention.

Furthermore, in the respective embodiments, the first circulating pump 10*a* and the second circulating pump 10*b* are constructed by directly coupled to the main oil feeding pump 7*a* and the auxiliary oil feeding pump 7*b*. However, in an alternation, the first circulating pump 10*a* and the second circulating pump 10*b* may be constructed so as to be driven by a motor different from the main oil feeding pump 7*a* and the auxiliary oil feeding pump 7*b*.

Figure 3:
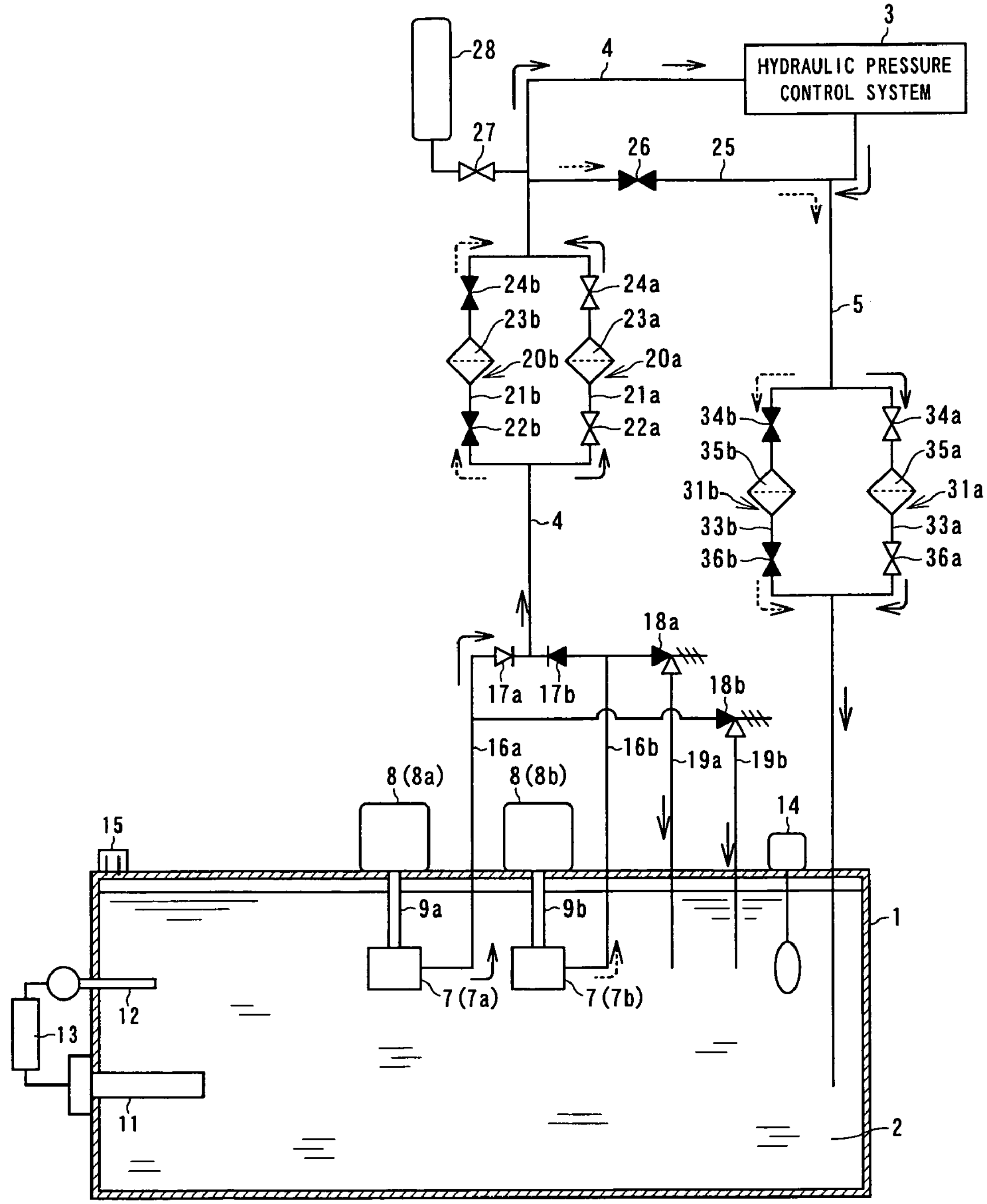

Furthermore, in the case where the coolers 35*a* and 35*b* shown in the respective embodiments or coolers equivalent thereto are relocated or disposed in parallel in the hydraulic oil return line 5, it is advantageous that further cooling effects may be obtainable by directly cooling the drain oil returned at high temperature. In this case, as shown in FIG. 3, the circulating line 6 is unnecessary to be provided.

Moreover, in the respective embodiments, for example, required number of stop valves, relief valves, check valves, filters, etc. are provided in the hydraulic oil feed line 4, the circulating line 6, the bypass line 25 and the like. However, the present invention functions by providing at minimum one stop valve, relief valve, check valve or filter, respectively, and the changes there of in location numbers may be optionally made.

In addition, as the direct heating means, other than the above described electrical heater, heating means by depressurizing method for atmospherically discharging the high pressure oil will be applied.

What is claimed is:

1. A hydraulic pressure generating apparatus comprising:

a hydraulic oil feed line for feeding hydraulic oil with high pressure from an oil tank to a hydraulic pressure control system of a generator by an oil feeding pump unit;

a hydraulic oil return line for returning drain oil from the hydraulic pressure control system to the oil tank; and a circulation line for circulating and purifying the hydraulic oil of the oil tank by a circulating pump unit, wherein the hydraulic oil is flame resistant hydraulic oil which is hardly deteriorated by direct heating, and the flame resistant hydraulic oil is heated by heating means disposed in the oil tank.

2. A hydraulic pressure generating apparatus comprising:

a hydraulic oil feed line for feeding hydraulic oil with high pressure from an oil tank to a hydraulic pressure control system of a generator by an oil feeding pump unit;

a hydraulic oil return line for returning drain oil from the hydraulic pressure control system to the oil tank; and a circulation line for circulating and purifying the hydraulic oil of the oil tank by a circulating pump unit, wherein said hydraulic oil is flame resistant hydraulic oil having specific gravity of less than 1.0, and the oil feeding pump is disposed on a side upper than a bottom portion in the oil tank.

3. A hydraulic pressure generating apparatus comprising:

a hydraulic oil feed line for feeding hydraulic oil with high pressure from an oil tank to a hydraulic pressure control system of a generator by an oil feeding pump unit;

a hydraulic oil return line for returning drain oil from the hydraulic pressure control system to the oil tank; and a circulation line for circulating and purifying the hydraulic oil of the oil tank without an activated clay filter by a circulating pump unit, wherein said control oil is flame resistant hydraulic oil having high oxidation resistance.

4. A hydraulic pressure generating apparatus according to any one of claims 1 to 3, wherein said flame resistant hydraulic oil is fatty acid ester oil.

5. A hydraulic pressure generating apparatus according to any one of claims 1 to 3, wherein said flame resistant hydraulic oil has a feeding pressure set to be equal to or more than 6.8 MPa.

6. A hydraulic pressure generating apparatus according to any one of claims 1 to 3, wherein said oil feeding pump unit includes a main oil feeding pump and an auxiliary oil feeding pump in parallel to the hydraulic oil feed line, and said circulating pump unit includes a first circulating pump and a second circulating pump in parallel to the circulation line, said main oil feeding pump and said first circulating pump being directly coupled, which are simultaneously driven by one motor, and said auxiliary oil feeding pump and said second circulating pump being directly coupled, which are simultaneously driven by another motor.

7. A hydraulic pressure generating apparatus according to any one of claims 1 to 3, wherein said hydraulic oil feed line is provided with at least one or more feed oil filters, check valves, and stop valves.

8. A hydraulic pressure generating apparatus according to any one of claims 1 to 3, wherein said circulation line is provided with at least one or more oil coolers, circulating oil filters, check valves, and stop valves.

9. A hydraulic pressure generating apparatus according to any one of claims 1 to 3, wherein said hydraulic oil feed line and said hydraulic oil return line are connected by a bypass line, and at least one or more stop valves are arranged to the bypass line.

10. A hydraulic pressure generating apparatus according to any one of claims 1 to 3, further comprising a temperature sensor for sensing temperature in the oil tank, and temperature control means for controlling heating means disposed in the oil tank in accordance with the temperature in the tank sensed by the temperature sensor.

11. A hydraulic pressure generating apparatus comprising:

a hydraulic oil feed line for feeding hydraulic oil with high pressure from an oil tank to a hydraulic pressure control system of a generator by an oil feeding pump unit including a main oil feeding pump and an auxiliary oil feeding pump in parallel to the hydraulic oil feed line, said hydraulic oil feed line being provided with at least one or more feed oil filters, check valves, and stop valves;

a hydraulic oil return line for returning drain oil from the hydraulic pressure control system to the oil tank; and a circulation line for circulating and purifying the hydraulic oil of the oil tank by a circulating pump unit including a first circulating pump and a second circulating pump in parallel to the circulation line, said circulation line being provided with at least one or more oil coolers, circulating oil filters, check valves, and stop valves, said main oil feeding pump and said first circulating pump being directly coupled, which are simultaneously driven by one motor, and said auxiliary oil feeding pump and said second circulating pump being directly coupled, which are simultaneously driven by another motor, and said hydraulic oil feed line and said hydraulic oil return line being connected by a bypass line, and at least one or more stop valves are arranged to the bypass line.

12. A hydraulic pressure generating apparatus according to claim 11, wherein said hydraulic oil is fatty acid ester oil which is fed at a feeding pressure set to be equal to or more than 6.8 MPa.

13. A hydraulic pressure generating apparatus according to claim 11, further comprising a temperature sensor for sensing temperature in the oil tank, and temperature control means for controlling heating means disposed in the oil tank in accordance with the temperature in the tank sensed by the temperature sensor.

* * * * *